United States Patent [19]

Ripberger et al.

[11] Patent Number: 4,843,698

[45] Date of Patent: Jul. 4, 1989

[54] PROCESS FOR THE PRODUCTION OF A CAST PISTON UPPER PART OF A TWO-PART PISTON

[75] Inventors: Emil Ripberger, Remseck; Hanspeter Wieland, Ditzingen, both of Fed. Rep. of Germany

[73] Assignee: Mahle GmbH, Stuttgart, Fed. Rep. of Germany

[21] Appl. No.: 137,109

[22] Filed: Dec. 23, 1987

[30] Foreign Application Priority Data

Dec. 24, 1986 [DE] Fed. Rep. of Germany ....... 3644548
Apr. 18, 1987 [DE] Fed. Rep. of Germany ....... 3713241

[51] Int. Cl.$^4$ .............................................. B23P 15/10
[52] U.S. Cl. .................................. 29/156.5 R; 92/172
[58] Field of Search .................... 29/156.5 R; 92/158, 92/159, 172

[56] References Cited

U.S. PATENT DOCUMENTS

| 1,770,818 | 7/1930 | Summers | 29/156.5 R |
| 3,538,574 | 11/1970 | Toma et al. | 29/156.5 R |
| 4,377,967 | 3/1983 | Pelizzoni | 92/158 X |

*Primary Examiner*—Timothy V. Eley
*Attorney, Agent, or Firm*—James C. Wray

[57] ABSTRACT

A process for the production of a cast piston upper part of a two-part piston comprising the steps of casting a piston head and a ring section having a collar of tab-type segments, wherein the tab-type segments have tapered ends; and bending over the tab-type segments in the direction towards the middle of the piston to form a lower closure serving as an annular cooling oil space.

4 Claims, 3 Drawing Sheets

PROCESS FOR THE PRODUCTION OF A CAST PISTON UPPER PART OF A TWO-PART PISTON

BACKGROUND TO THE INVENTION

The invention relates to the upper part of a two-part piston for internal combustion engines comprising a piston head exposed to the combustion gases, a ring section merging radially externally into this head and accommodating the piston ring grooves, having hubs issuing integrally from the head at a distance from the ring section for the reception of a piston pin carrying a piston skirt.

STATEMENT OF PRIOR ART

An upper part of the kind described above is known in forged form from DE No. 35 02 248 C1.

In pistons with upper part of such form it is furthermore known for the somewhat annular space lying between hub and internal circumference of the ring section and adjoining the piston head to be covered approximately at the level of the free end of the ring section in order thus to produce an approximately closed annular space through which cooling oil can flow. Such a covering is known for example from U.S. Pat. No. 4,377,967. There a subsequently fitted lid part effects the covering.

In the case of a one-piece forged piston it is possible according to DE-AS No. 12 10 302 to work a laterally radially outwardly open ring passage in the interior of the upper piston region, which passage can then be subsequently closed by the bending towards it of a wall section radially externally extending around the open ring passage. This however is possible only with material-removing machining of the initially radially outwardly open ring passage. Such material removing machining involves a machining expense which is undesired in practice.

In the case of cast piston upper parts, closed cooling oil annular spaces could hitherto be produced only either by the use of a releasable core or, as in forged upper parts, by the subsequent fitting of a lid part on the ring section.

OBJECT OF THE INVENTION

An object of the invention with regard to a forged piston upper part, on the basis of a piston according to DE No. 35 02 248 C1, and with a cast piston upper part on the basis of U.S. Pat. No. 4,377,967 is in each case to produce the piston upper part, in the case of a two-part assembly of the piston, in an economically simpler manner, that is especially without material-removing machining in the forged version or the use of releasable cores in the cast version, and to produce a shaker chamber for cooling oil in the space between ring section and piston head interior. A further object is to dispense with cover plates.

SUMMARY OF THE INVENTION

According to the invention there is provided an upper part of a two-part piston for internal combustion engines comprising (a) a piston head exposed to the combustion gases,
(a) a ring section merging radially externally into this head and accommodating the piston ring grooves,
(c) having hubs issuing integrally from the head at a distance from the ring section for the reception of a piston pin carrying a piston skirt, and
(d) an annular collar formed integrally on the lower free circumferential end of the ring section extends radially inwards with spacing from the piston head for the formation of a shaker chamber for cooling oil sprayed from beneath on to the piston head, which annular collar consists of individual segments lying side by side on its circumference, which taper, in the circumferential plane of the annular collar, to their radially inwardly lying free ends.

Further according to the invention there is provided a process for the production of a forged upper part of a two-part piston comprising the steps of (a) producing a piston head blank, the ring section of which is inclined in relation to the plane of the piston head at an angle between 0° and less than 90° and in which the ring section to be subsequently bent over is formed with
  (i) an annular collar consisting of individual segments, in the free circumferential end zone of the ring section to be bent over, on the side of the ring section which comes to lie towards the piston head interior after the bending over, while in the axial direction of the piston upper part it is free from undercutting and has a height which approximately corresponds to the radial distance in each case between the internal circumference of the finished ring section,
  (ii) the hubs, and
  (iii) with its free circumferential end pronged in crown manner for the formation of the individual segments, and
(b) bending over said ring section whereby to form a lower closure of the cooling oil space.

The crown-like prongs, forming the individual segments, on the free circumferential edge of the annular collar, which the annular collar comprises on the preliminary moulding, facilitate the production process. The formation of the annular collar edge in crown prong form on the preliminary moulding serves in fact so that, in the turning over of the ring section the annular collar does not lose its predefined form. Without a ring collar pronged over nearly the entire height this danger, due to the deforming of the free end of the annular collar from a larger to smaller diameter, would consist in that the collar material would assume an undulatory form.

Since cooling oil is to be introduced into the annular chamber to be formed as oil-shaker space from the end opposite to the piston head, in the finished piston openings should be present in the annular collar for the introduction and withdrawal of the cooling oil. These openings can already be provided as apertures in the annular collar in the preliminary moulding.

BRIEF DESCRIPTION OF DRAWINGS

Examples of embodiment for the forged or cast upper part assembled in accordance with the invention are represented in the drawing. The progress of the production process in each case, starting from a forged preliminary form or cast blank with formed-on annular collar is likewise reproduced diagrammatically in the drawing, wherein.

DESCRIPTION OF PREFERRED EMBODIMENT(S)

Figure 1:
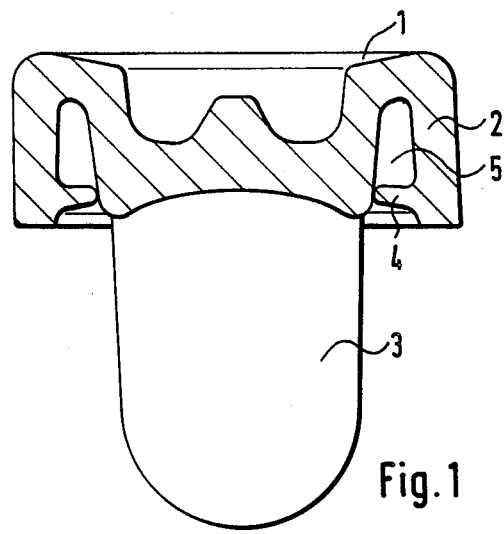
FIG. 1 shows a longitudinal section through the upper part of a finished forged piston blank.
Figure 2:
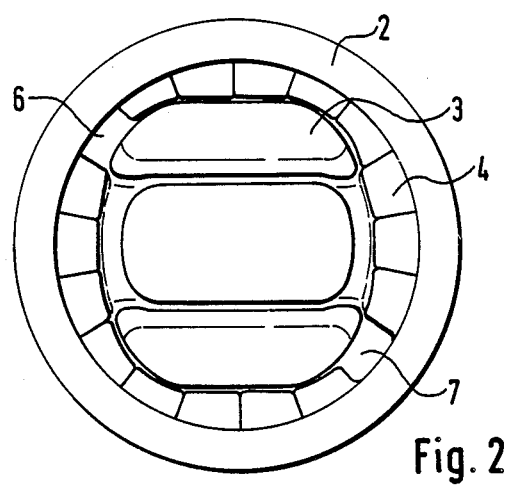
FIG. 2 shows a view of this piston upper part, from beneath.
Figure 6:
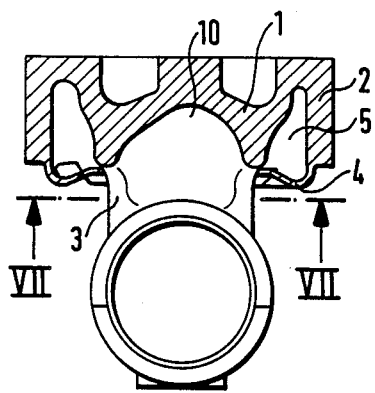
FIG. 6 shows a longitudinal section through the upper part of a cast blank with completely bent-over annular collar of tab-type segments.
Figure 9:
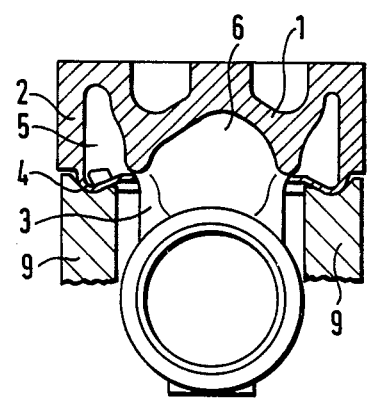
FIG. 9 shows a longitudinal section through the piston upper part casting blank with a tool effecting the bending over of the tab-type segments.

In the finished piston upper part blank according to FIGS. 1, 6 and 9 the piston head is designated by 1, the ring section for the accommodation of the piston ring grooves (not shown) by 2, the hubs by 3 and the annular collar, forming a cooling oil chamber 5, by 4.

Figure 3:
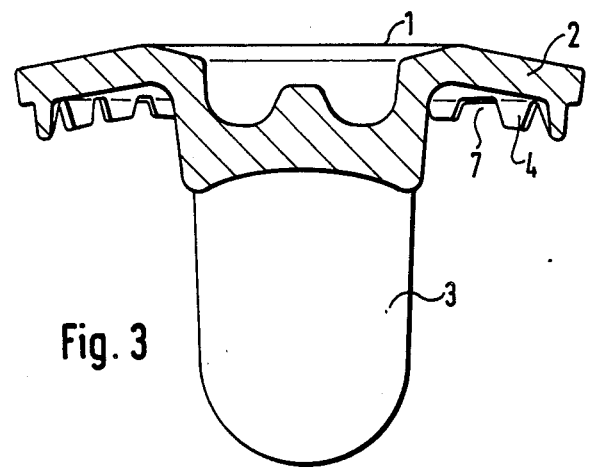
FIGS. 3 to 5 show a diagrammatic representation of the reshaping of the ring section with the annular collar of the preliminary forging into the end position on the finished piston upper part blank.
Figure 4:
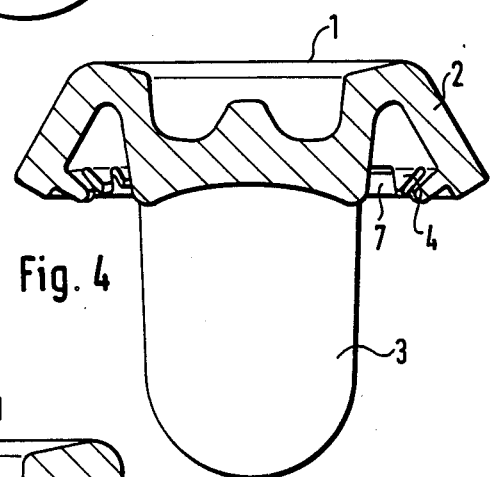
Figure 5:
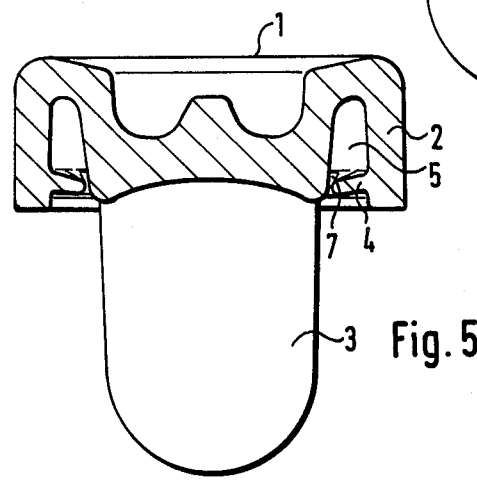

The finished piston blank is produced from the preliminary forging as represented in section in FIG. 3, by turning over of the ring section 2. The annular collar 4 assembled from individual segments of pronge shaped configuration initially retains its position in relation to the ring section 2, in the turning over of the ring section 2. Due to the bringing of the annular collar 4 to a smaller diameter, the gaps between the individual prongs gradually close. When in the case of the forged piston upper part version the ring section 2 has reached its end position as shown in FIG. 5, in a concluding forging operation the annular collar 4 is reshaped, that is turned, into its final position in which it is inclined towards the piston head.

The apertures 6 and 7 for the supply and withdrawal of cooling oil into and from the cooling oil chamber 5 are already provided in the annular collar on the preliminary moulding in FIG. 3. In this way these apertures can be formed without the necessity of a material-removing machining.

The annular collar 4 does not have to be formed on the extreme end of the ring section 2. Rather it can be formed thereon closer to the piston head 2, if only it is guaranteed that a cooling oil chamber 5 can also form.

In the case of the piston upper part cast blank according to FIG. 6 the tab-type segments of the annular collar 4, which are turned over radially inwards for the formation of the cooling oil annular space, protrude as axial prolongation beyond the ring section 2. In this way the cast blank can be produced simply and especially without the use of releasable cores. The edges of the tab-type segments of the annular collar 4 must taper towards the free ends of the segments so that after a radially inward turning over the segments lie tightly on one another at their adjoiiing edges. The axial length of the individual segments of the annular collar 4 is so dimensioned that each segment rests relatively tightly on the hubs 3 after turning over radially inwards, that is towards the middle of the piston.

In the region of the plane of abutment of the segments of the annular collar 4 the hubs 3 expediently have a circumferentially somewhat closed circular form, and the circle can also be any desired polygonal curve closed upon itself. The hub supporting should be circumferentially closed in this region in order in this way to be able to achieve a closed annular cooling oil space 5, as simply as possible.

Figure 7:
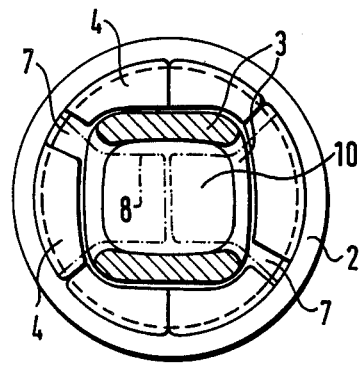
FIG. 7 shows a view of the piston upper part casting blank along the line VII—VII in FIG. 6.
Figure 8:
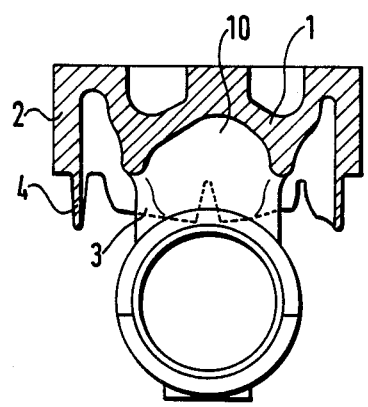
FIG. 8 shows a longitudinal section through a piston upper part casting blank with annular collar segments not yet turned over.

In cases where the hubs extending from the pin eyes to the piston head 1 do not open into a common closed hub support, the interspaces can also be filled out by segments 8 formed correspondingly axially longer on the ring section 2 (indicated in dot-and-dash lines in FIG. 7), in which case the length of the segments can be made so great that mutually diametrically opposite segment sections, after bending over, are in tight contact at their ends.

In the case of pistons which comprise beneath the piston head 1 a ring hub support which divides up towards the pin eyes into individual hubs, the latter measures make it possible, due to the tab-type segments 8 engaging correspondingly long into the space lying between the hubs 3, to produce a central cooling oil space in the region 10 as well as the cooling oil annular space 5.

In order that cooling oil may be introduced into the cooling oil annular space 5 and withdrawn therefrom again, as in the forged version a greater spacing is provided between individual segments 4 in the circumferential direction, so that cooling oil supply or withdrawal openings 6, 7 can form automatically after the bending over of the segment sections.

In FIG. 9 a tool 9 is shown with which the segments of the annular collar 4, in the cast blank, can be bent over out of the axial position radially inwards through about 120°. Bending over through more than 90° is expedient in order thus to achieve the covering of the cooling oil annular space 5 by a kind of oil collecting groove.

We claim:

1. A process for the production of a cast piston upper part of a two-part piston comprising the steps of:
   (a) casting a piston head and a ring section having a collar of tab-segments, the tab-type segments have tapered ends and are a prolongation of the ring section, and
   (b) bending over said segments in the direction towards the middle of the piston to form a lower closure serving as an annular cooling oil space.

2. A process according to claim 1, wherein an axial height of the tab-type segments of the collar before the bending operation corresponds to a radial distance between feet of the tap-type segments and opposite hubs.

3. A process for the production of a forged upper part of a two-part piston comprising the steps of:
   (a) producing a piston upper part blank comprising a piston head, a ring section having an annular collar, and hubs,
   wherein the ring section is inclined in relation to a plane of the piston head at an angle between 0° and 90° and the ring section merges radially into the piston head,
   wherein the hubs issue integrally from the piston head, and
   wherein the annular collar is formed integrally on a lower free circumferal end of the ring section and has individual segments lying side by side on a circumference of the annular collar which have tapered ends; and
   (b) bending over a portion of the ring section having the annular collar thereby forming a lower closure of a cooling oil space.

4. The process according to claim 3, wherein the process further comprises deforming the annular ring during or at the end of bending the ring section in the direction of the piston head in relation to the ring section so that the end position of the ring section to which the annular collar is integrally formed is at least parallel to the plane of the piston head or is so inclined that the tapered ends of the tab-type segments come to lie closer to the piston head than the section of the annular collar integrally merged into the ring section.

* * * * *